(12) United States Patent
Miao et al.

(10) Patent No.: US 10,810,589 B2
(45) Date of Patent: Oct. 20, 2020

(54) VALIDATION OF DAMAGED BANKNOTES

(71) Applicant: NCR Corporation, Duluth, GA (US)

(72) Inventors: YunQian Miao, Waterloo (CA); Gary Ross, Edinburgh (GB)

(73) Assignee: NCR Corporation, Atlanta, GA (US)

( * ) Notice: Subject to any disclaimer, the term of this patent is extended or adjusted under 35 U.S.C. 154(b) by 226 days.

(21) Appl. No.: 15/444,248

(22) Filed: Feb. 27, 2017

(65) Prior Publication Data

US 2018/0247308 A1    Aug. 30, 2018

(51) Int. Cl.
  *G06K 9/62*   (2006.01)
  *G06Q 20/40*  (2012.01)
  *G06Q 20/10*  (2012.01)
  *G07D 7/12*   (2016.01)
  *G07D 7/185*  (2016.01)
  *G07D 7/20*   (2016.01)
  *H04N 5/33*   (2006.01)

(52) U.S. Cl.
  CPC ......... *G06Q 20/401* (2013.01); *G06K 9/6202* (2013.01); *G06Q 20/1085* (2013.01); *G07D 7/12* (2013.01); *G07D 7/185* (2013.01); *G07D 7/20* (2013.01); *H04N 5/33* (2013.01)

(58) Field of Classification Search
  CPC .... G06Q 20/401; G06Q 20/1085; G07D 7/20; G07D 7/12; G07D 7/185; G06K 9/6202; H04N 5/33
  See application file for complete search history.

(56) References Cited

U.S. PATENT DOCUMENTS

| | | | | |
|---|---|---|---|---|
| 4,184,081 A | * | 1/1980 | Bergamini | G06K 9/00 250/556 |
| 4,529,318 A | * | 7/1985 | Curl | G01N 21/8901 250/559.15 |
| 5,437,357 A | * | 8/1995 | Ota | G07D 7/12 194/206 |
| 6,766,045 B2 | | 7/2004 | Slepyan et al. | |
| 8,522,949 B2 | | 3/2013 | Nireki | |
| 8,510,062 B2 | | 8/2013 | Domke et al. | |
| 2003/0169899 A1 | * | 9/2003 | Slepyan | G06T 1/005 382/100 |

(Continued)

FOREIGN PATENT DOCUMENTS

EP          1250682 A1  *  10/2002  ............... G07D 7/12

OTHER PUBLICATIONS

Barnett, Jeffrey, "Computational Methods for a Mathematical Theory of Evidence", Proceedings of the Seventh International Joint Conference on Artificial Intelligence. *This research is supported by the Defense Advanced Research Projects Agency under Contract No. DAHC15 72 C 0308., (1981), 25 pgs.

(Continued)

*Primary Examiner* — Narayanswamy Subramanian
*Assistant Examiner* — Paul S Schwarzenberg
(74) *Attorney, Agent, or Firm* — Schwegman, Lundberg & Woessner

(57) ABSTRACT

Systems and methods for validation of a media object may include receiving the media object and detecting, using a sensor, a damaged portion of the media object. The media object may be validated against a standard. During the validation of the media object, the damaged portion of the media object may be given less weight.

17 Claims, 4 Drawing Sheets

(56) References Cited

U.S. PATENT DOCUMENTS

| | | | | |
|---|---|---|---|---|
| 2008/0061143 A1* | 3/2008 | Plaschka | ............ | G06K 7/12 |
| | | | | 235/462.01 |
| 2009/0312957 A1* | 12/2009 | Domke | ............ | G01N 29/0618 |
| | | | | 702/39 |
| 2011/0061988 A1* | 3/2011 | Lonsdale | ............ | G07D 7/12 |
| | | | | 194/303 |
| 2011/0255750 A1* | 10/2011 | Wunderer | ............ | G07D 7/182 |
| | | | | 382/112 |
| 2012/0045112 A1* | 2/2012 | Lundblad | ............ | G07D 7/162 |
| | | | | 382/135 |
| 2013/0034291 A1* | 2/2013 | Minin | ............ | G06K 9/00 |
| | | | | 382/137 |
| 2015/0016706 A1* | 1/2015 | Hsu | ............ | G07D 7/04 |
| | | | | 382/135 |

OTHER PUBLICATIONS

Ji Lee et al: "A Survey on Banknote Recognition Methods by Various Sensors", Sensors, vol. 17, No. 2, Feb. 8, 2017 (Feb. 8, 2017), p. 313, XP055463418, DOI: 10.3390/s17020313 * paragraphs [02.2], [02. 3] *.

* cited by examiner

VALIDATION OF DAMAGED BANKNOTES

BACKGROUND

Self-service terminals have become ubiquitous within the retail and banking environments. At the retail level, self-service terminals reduce labor requirements and increase check-out efficiency by allowing one cashier to oversee many check-out lanes. Within the financial services sector, self-service terminals, or automated teller machines, allow banking and other financial customers to make withdrawals and deposits or perform other financial transactions without having to find time to visit a financial institution during banker's hours or even visit a financial institution.

SUMMARY

Systems and methods for validation of a media object may include receiving the media object and detecting, using a sensor, a damaged portion of the media object. The media object may be validated against a standard. During the validation of the media object, the damaged portion of the media object may be given less weight.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
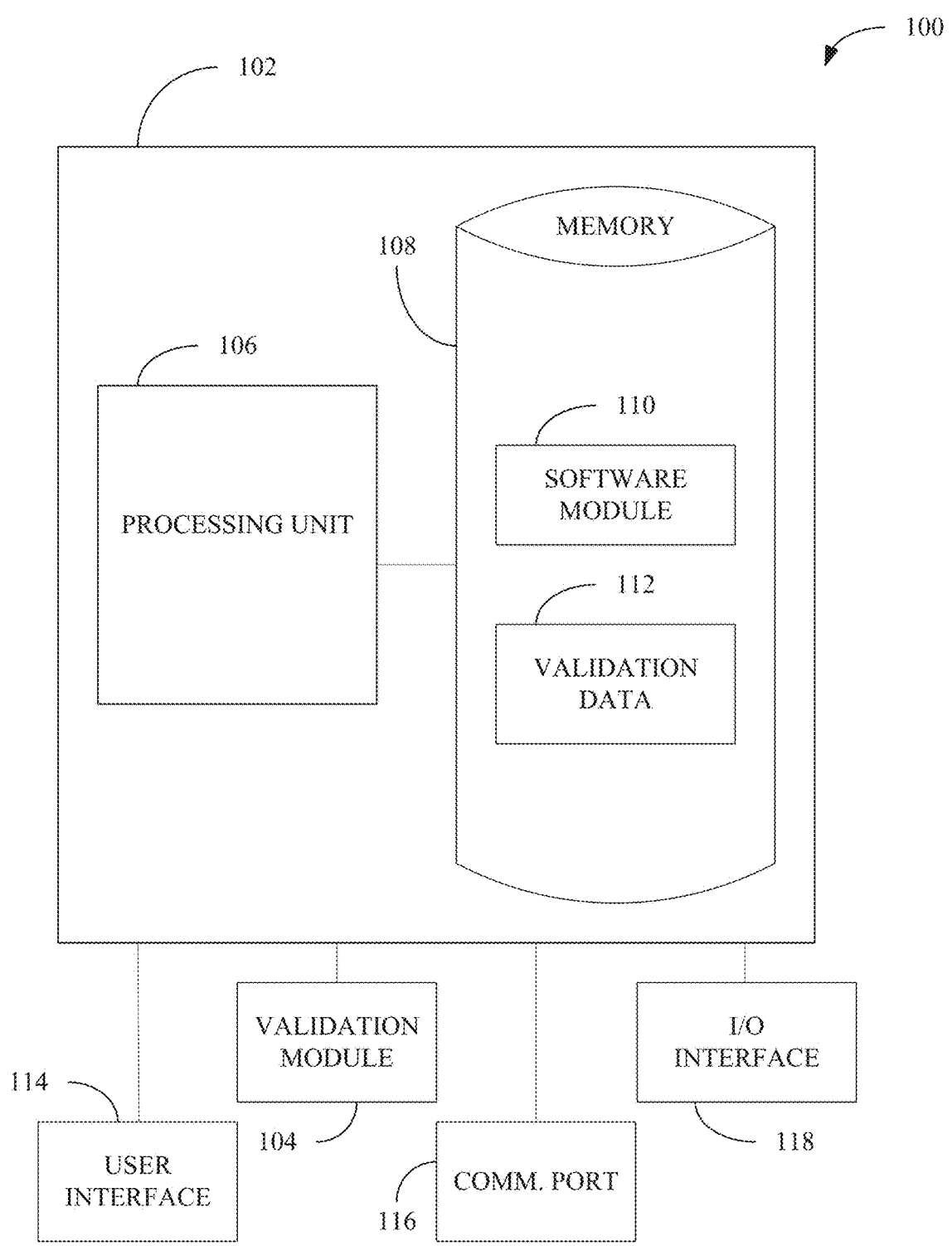
FIG. 1 shows an example schematic of a self-service terminal consistent with the disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit the disclosure. Instead, the proper scope of any invention disclosed herein is defined by the appended claims.

Self-service terminals may accept media objects of different sizes and conditions. For example, an automated teller machine (ATM) may accept currency having different sizes and in different states of wear. For instance, banknotes of many countries are different sizes depending on the denomination. Also, banknotes that are newer may have less damage or other signs of wear than older banknotes. Examples of a self-service terminal include, but are not limited to, an automated teller machine, a self-service checkout register, a slot machine, arcade game, and a vending machine.

It is natural that some banknotes in circulation are partially damaged. For example, banknotes may have tears, holes, graffiti, and missing or folded corners. For an automatic banknote validation system, such damage brings about great challenge due to the contamination of security feature. Consequently, rejection caused by the damage may lead to rejection of valid banknotes.

Validation of the media object may be needed to combat fraudulent activity occurring where torn pieces or folded pieces of paper are being inserted into the self-service terminal. In addition, validation of the media object may be needed, not to combat fraudulent activity, but to help enforce fitness definitions set by banking institutions or government banking authorities. For example, fitness definitions may require that at least 50% of a banknote be present for the banknote to be legal tender. Other fitness definitions may prohibit banknotes that have been defaced or otherwise appear to be altered.

As disclosed herein, banknotes may be analyzed in comparison to a standard. That standard may be defined by the fitness definitions for the banking institution or government producing the banknote. For example, the fitness definitions for a banknote may include that at least 50% of the banknote be present, that a portion (e.g., at least 50%) of a watermark be present, that a security strip be present.

When a banknote is received by the self-service terminal, an image of the banknote may be captured via a sensor, such a camera, infrared scanner, etc. Using the image, the type and size of damage to the banknote can be determined. The image of the banknote may be deduced to a data structure that indicates damaged portions of the banknote.

Once the damaged portions are identified, they can be examined using a standard, such as fitness definitions. If the damaged portions exceed a threshold, then the banknote may be rejected and the user instructed to see a teller or other personnel that can inspect the banknote.

Once the image is captured and it is determined that enough of the various security features are not damaged or otherwise missing, the non-damaged validation features (i.e., security features) can be extracted from the image and compared to the standard on a pixel by pixel basis.

Turning now to the figures. FIG. 1 shows an example schematic of a self-service terminal 100 consistent with embodiments disclosed herein. The self-service terminal 100 may include a computing environment 102 and a validation module 104. The validation module 104 may act as a media accepter/dispenser. During operation, the validation module 104 may accept media objects such as checks, banknotes, or other negotiable instruments. As discussed herein, the validation module 104 may operate in conjunction with the computing device 102 to accept media and properly orient the media.

As shown in FIG. 1, the computing device 102 may include a processor 106 and a memory unit 108. The memory unit 108 may include a software module 110 and validation data 112. While executing on the processor 106, the software module 110 and the validation data 112 may perform processes for validating a media object, including, for example, one or more stages included in method 300 described below with respect to FIG. 3.

The validation data 112 may include specifications for valid media objects. Examples of validation data 112 include, but are not limited to, pixel data for valid security features such as transmissivity ranges for each pixel of a standard or know image of a security feature. In addition, the validation data 112 may include a size of a banknote.

The self-service terminal 100 may also include a user interface 114. The user interface 114 may include any number of devices that allow a user to interface with the self-service terminal 100. Non-limiting examples of the user interface 114 may include a keypad, a microphone, a speaker, a display (touchscreen or otherwise), etc.

The self-service terminal 100 may also include a communication port 116. The communication port 116 may allow the self-service terminal 100 to communicate with information systems such as banking and other financial systems. Non-limiting examples of the communication port 116 may include, Ethernet cards (wireless or wired), Bluetooth® transmitters and receivers, near-field communication modules, etc.

The self-service terminal may also include an input/output (I/O) device 118. The I/O device 118 may allow the self-service terminal 100 to receive and output information. Non-limiting examples of the I/O device 118 may include, a camera (still or video), a printer, a scanner, etc.

Figure 2:
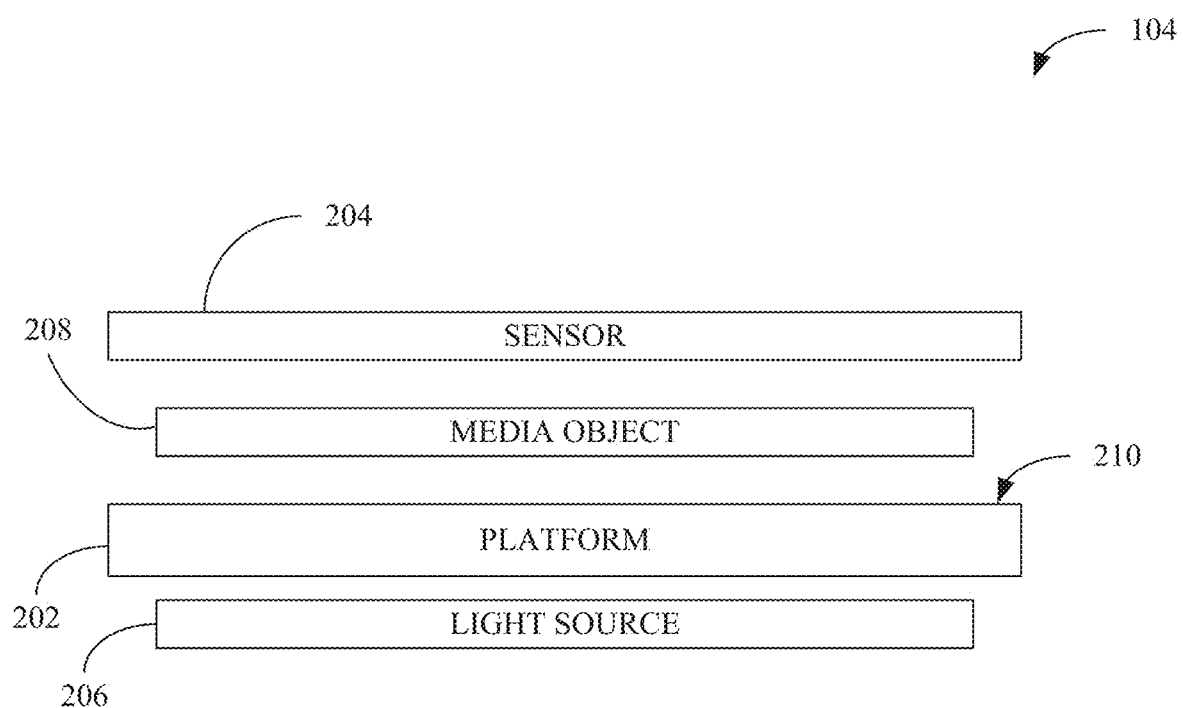
FIG. 2 shows an example validation module consistent with the disclosure.

FIG. 2 shows an example schematic of the validation module 104. The validation module 104 may include a platform 202, a sensor 204, and a light source 206. While FIG. 2 shows the sensor 204 and the light source 206 as two separate items, they may be combined into one single item. For example, the light source 206 and the sensors 204 may be a single item located on top of the platform 202 and a reflective source may be located beneath a media object 208. For example, the reflective source may be located on a top surface 210 of the platform 202.

While not shown, the validation module 104 may also include a motor or other drivetrain components that may be used to position the media object 108. For example, the validation module 104 may include a component of a deskew module. Thus, the deskew module may deskew the media object 108 for validation.

Figure 3:
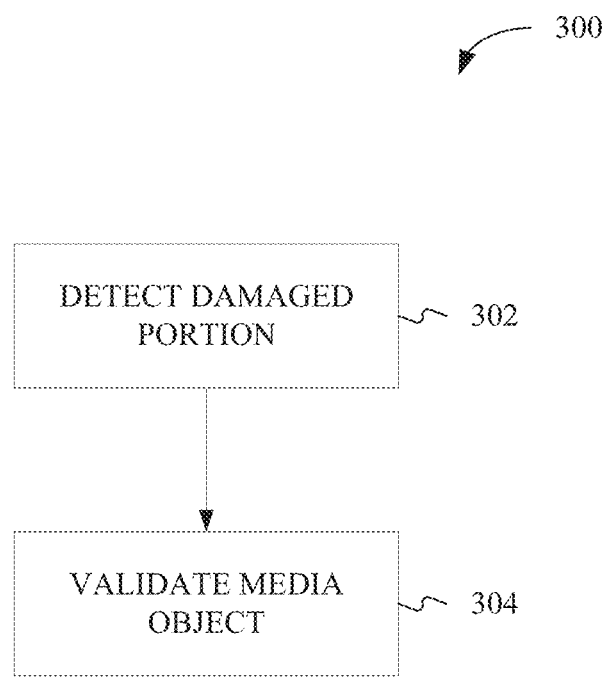
FIG. 3 shows a method consistent with the disclosure.

FIG. 3 shows example stages of a method 300 for validating a media object. The method may begin at stage 302 where a damaged portion of the media object may be detected. As disclosed herein, detecting the damaged portion of the media object may include determining that a portion of the media object is missing, includes a fold, or is otherwise defaced.

Figure 4A:
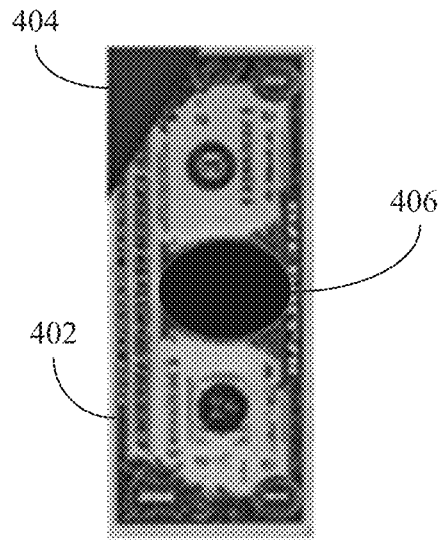
FIGS. 4A and 4B show examples of damaged media objects, sensing with reflective images, consistent with the disclosure.
Figure 4B:
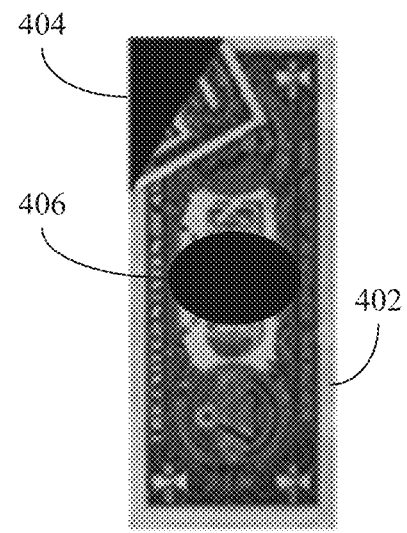
Figure 5A:
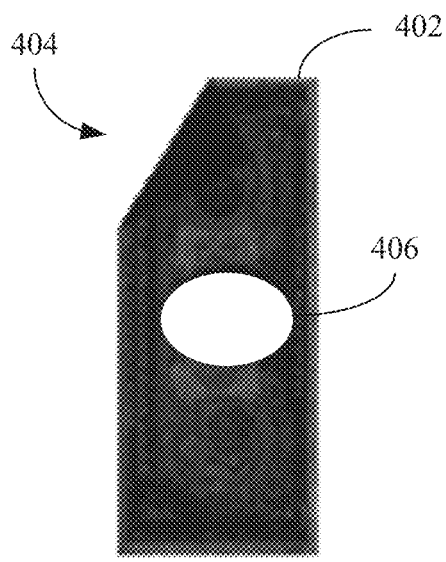
FIGS. 5A and 5B shows examples of damaged media objects, sensing with transmissive image, consistent with the disclosure.
Figure 5B:
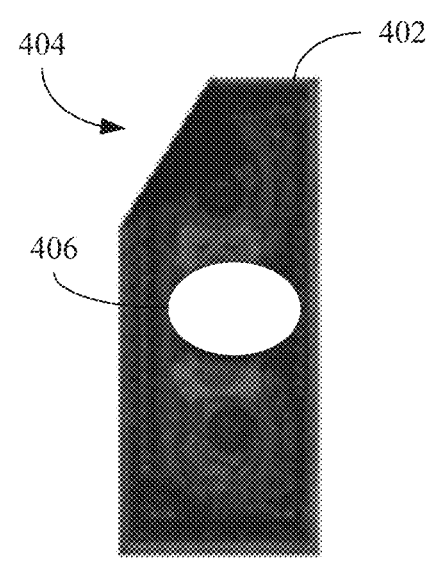

For example, FIGS. 4A and 4B show examples of a damaged media object 402. As shown in FIGS. 4A and 4B the damaged media object 402 may include a fold 404 and the portrait of George Washington may be removed as indicated by reference numeral 406. FIGS. 5A and 5B show examples of transmission images of the damaged media object 402 as captured by the sensor 104. As seen in FIGS. 5A and 5B, the sensor 104 may be a transmissivity image that may reveal watermarks, security strips, or other security features embedded within the damaged media object 402. Also as shown in FIGS. 5A and 5B, portions of the media object that are missing or damaged may not show attenuation of light and may appear white or another color.

From stage 302, the method 300 may proceed to stage 304 where the media object may be validated. As disclosed herein, media objects may be validated by extracting security features which may contain corrupt information. As shown in FIGS. 4A, 4B, 5A, and 5B, the missing portion may show black in reflective images and shows saturation white in transmissive images. The images of damaged media objects may degrade a template matching process. The degree of impact caused by the damaged media objects may vary from currency to currency, depending on where the damage is located, and how security features are treated for that specific currency.

As disclosed herein, a mathematical solution, implemented in software, may effectively handle damaged note validation. For example, as disclosed herein, the validation module 104 may detect damage type and size of media objects from the infrared transmissive images. Once the images are captured, a data structure, referred to as a "DmMap," may be deduce that indicates the damaged portion of a media object. For example, the image may be broken down to its individual pixels.

Validation features may be extracted from images by considering image pixels that are properly presented as:

$$fea(s_i)=g(x|(x \in s_i)/\backslash (x \notin DmMap)) \qquad \text{Eq. 1}$$

where $s_i$ is a segment i and may indicate an area of one security feature, and $g(\cdot)$ is a function in feature extraction, which is not necessarily bound to a specific definition.

A model of the "degree-of-belief." $B(s_i)$, for segment $s_i$ as:

$$B(s_i) = \begin{cases} \#(\text{pixels} \in s_i \wedge \text{pixels} \notin DmMap)/\#(\text{pixels} \in s_i) & \text{if } B(.) \geq X \\ (\#(\text{pixels} \in s_i \wedge \text{pixels} \notin DmMap)/\#(\text{pixels} \in s_i))^2 & \text{otherwise} \end{cases} \qquad \text{Eq. 2}$$

The value X may be any percentage ranging from 0% to 100%. For example, X may be 0.60 (60%) and may indicate that number of pixel within a security feature and may be used as a weight in validating a media object as disclosed herein.

When matching with against a standard, or a trained template, a distance function may be defined as:

$$\text{dist}(\text{TestNote},\text{Template})=h(((fea(s_i)-\text{Template}(s_i))*B(s_i)|i=1,2,\ldots k)) \qquad \text{Eq. 3}$$

where $h(\cdot)$ is a template validation distance function, which is not necessarily bound to a specific definition.

Because of this evidence-based belief model, the security features may be extracted from undamaged portion only, and may consider the uncertainty of a security feature by using the number of effective pixels in comparison with number of pixels supposed to participate in that segment. For example, if a portion of a security feature should have N number of pixels, but only contains M number of pixels being properly presented, the uncertainty of the security feature may change. For instance, if X=0.60, N=100, and M=75, the using Eq. 2, $B(\cdot)=0.75$ and distance between the media object to be validated and the template, as indicated by Eq. 3 would be given a weight of 0.75 in the validation process. If M=59, then $B(\cdot)$ would equal 0.59 and using Eq. 3, the use of the security feature in the validation process would be given a weight of 0.59 squared, or 0.3481.

The systems and methods disclosed herein are applicable to different scenarios and are not tied with any specific template. For example, if one segment of the media object has no pixel falling into damage area, then its degree-of-belief, $B(s_i)=1$, and thus, the feature will be the same as original calculation and no extra effect is being introduced. If there is one segment that part of pixels falls into a damaged area and part of pixels show normal, then its feature will be extracted based on the effective pixels plus downgrading its certainty by a degree-of-belief calculated from Eq. 2. If there is a segment in which all of the pixels are missing due to note damage, then its degree-of-belief $B(s_i)=0$. This leads to this specific feature not being involved in the template matching process, as defined by Eq. 3, because there is no observation to support this feature.

During executing of the method 300 signals may be transmitted from the sensor 204 to the processing unit 106. In addition, the processing unit 106 may be retrieve validation data 112. For example, during the execution of the method 300 the processing unit 106 may retrieve banknote data corresponding to fitness definitions. In addition, the processing unit 106 may receive signals from other sensors (not shown) in addition to the sensor 204. For example, the processing unit 106 may receive signals from an infrared sensor and a moisture sensor. The processing unit 106 may utilize this data along with other data received by the processing unit 106 (either from other sensors, the memory 108, or calculated by the processing unit 106) to validate the media object as disclosed herein.

The systems and methods disclosed herein improve the functionality of a self-service terminal. For example, using the systems and methods disclosed herein, the self-service terminal may be able to self-diagnose a situation where a media object may be fraudulent or otherwise fail to satisfy fitness definitions. By being able to self-diagnose media objects as potentially fraudulent, the self-service terminal may be able to prevent the use of fraudulent or purposefully damaged media objects.

Table 1 shows test data for validation of a U.S. $5 banknote using a standard media validator in comparison with the systems and methods disclosed herein. The banknote included a corner fold of increasing size. The table shows acceptance rates for the banknote for two document validation modules (DVM) using current technology and a DVM using the systems and methods disclosed herein (DVM #3). As shown in Table 1, the DVM using the systems and methods disclosed herein can validate media object with substantial damage (a 20 mm×40 mm corner fold) at a rate of over 98% as compared to the less than 53% rate for current technology.

TABLE 1

Validation Module Acceptance Data

| Corner Fold | 20 mm × 20 mm | 28 mm × 28 mm | 20 mm × 40 mm |
|---|---|---|---|
| DVM #1 | 96.46% | 38.13% | 30.21% |
| DVM #2 | 100.00% | 72.71% | 52.92% |
| DVM #3 | 100.00% | 99.38% | 98.75% |

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method of validation of a media object, the method comprising:
   receiving, at a self-service terminal, the media object;
   passing, by the self-service terminal, infrared light through the media object via a light source associated with the self-service terminal;
   receiving, at a processor of the self-service terminal, a reflective image of the media object and a transmissive image of the media object;
   determining, using an infrared sensor of the self-service terminal, that a security feature of the media object is present;
   detecting, using the infrared sensor of the self-service terminal, a damaged portion of the security feature, wherein detecting the damaged portion of the security feature includes detecting a lack of attenuation of the infrared light passed through the security feature by detecting:
      a white color present in the transmissive image, and
      a black color present in the reflective image;
   validating, by the self-service terminal, the media object against a standard, wherein the damaged portion of the security feature is given less weight during validation; and
   accepting or rejecting, by the self-service terminal, the media object based on validation of the media object, wherein the damaged portion of the security feature includes a missing portion of the security feature.

2. The method of claim 1, wherein detecting the damaged portion of the security feature includes creating a data map of the security feature.

3. The method of claim 2, wherein creating the data map includes assigning a value for each pixel of an image of the security feature.

4. The method of claim 1, wherein validating the media object against the standard includes comparing an average pixel value for pixels of an image of the security feature against a known pixel average for the security feature.

5. The method of claim 1, wherein the sensor includes an infrared camera and detecting the damaged portion of the security feature includes capturing an image of the security feature using the infrared camera.

6. The method of claim 1, wherein the damaged portion of the media object includes a folded portion of the security feature.

7. A self-service terminal including a system for validating a media object, the system comprising:
   an infrared sensor;
   a processor; and
   a memory storing instructions that, when executed by the processor, cause the processor to perform operations comprising:
      receiving, from the infrared sensor, reflective and transmissive images of the media object,
      determining that a security feature of the media object is present;
      detecting a damaged portion of the security feature based on the reflective and transmissive images of the media object, wherein detecting the damaged portion of the security feature includes detecting a white color present in the transmissive image and a black color present in the reflective image, the white and black colors representing a lack of attenuation of infrared light,
      validate the media object against a standard, wherein the damaged portion of the security feature is given less weight during validation, and
      accepting or rejecting the media object based on validation of the media object,
      wherein the damaged portion of the security feature includes a missing portion of the security feature.

8. The self-service terminal of claim 7, wherein detecting the damaged portion of the security feature includes creating a data map of the security feature.

9. The self-service terminal of claim 8, wherein creating the data map includes assigning a value for each pixel of an image of the security feature.

10. The self-service terminal of claim 7, wherein validating the media object against the standard includes comparing an average pixel value for pixels of an image of the security feature against a known pixel average for the security feature.

11. The self-service terminal of claim 7, wherein the sensor includes an infrared camera.

12. The self-service terminal of claim 7, wherein the damaged portion of the security feature includes a folded portion of the security feature.

13. An automated teller machine including a document validation module comprising:
a camera operable to capture both a transmissive image and a reflective image of a media object;
a processor operable to:
receive the transmissive image and the reflective image from the camera,
determine that a security feature of the media object is present,
detect a damaged portion of the security feature based on a transmissivity value associated with each pixel of the image, wherein detecting the damaged portion of the security feature includes detecting a lack of attenuation of infrared light passed through the security feature and the presence of a black color for the reflective image and a white color for the transmissive image,
validate the media object against a standard, wherein the damaged portion of the security feature is given less weight during validation, and
accepting or rejecting the media object based on validation of the media object,
wherein the damaged portion of the security feature includes a missing portion of the security feature.

14. The automated teller machine of claim 13, wherein detecting the damaged portion of the security feature includes creating a data map of the security feature.

15. The automated teller machine of claim 14, wherein creating the data map includes assigning a value for each pixel of an image of the security feature.

16. The automated teller machine of claim 13, wherein the damaged portion of the security feature includes a folded portion of the security feature.

17. The automated teller machine of claim 13, wherein the document validation module is a component of one an automated teller machine, a self-service terminal, a slot machine, or a vending machine.

* * * * *